S. N. EDGAR.
FLY TRAP.
APPLICATION FILED APR. 23, 1912.
1,055,620.
Patented Mar. 11, 1913.
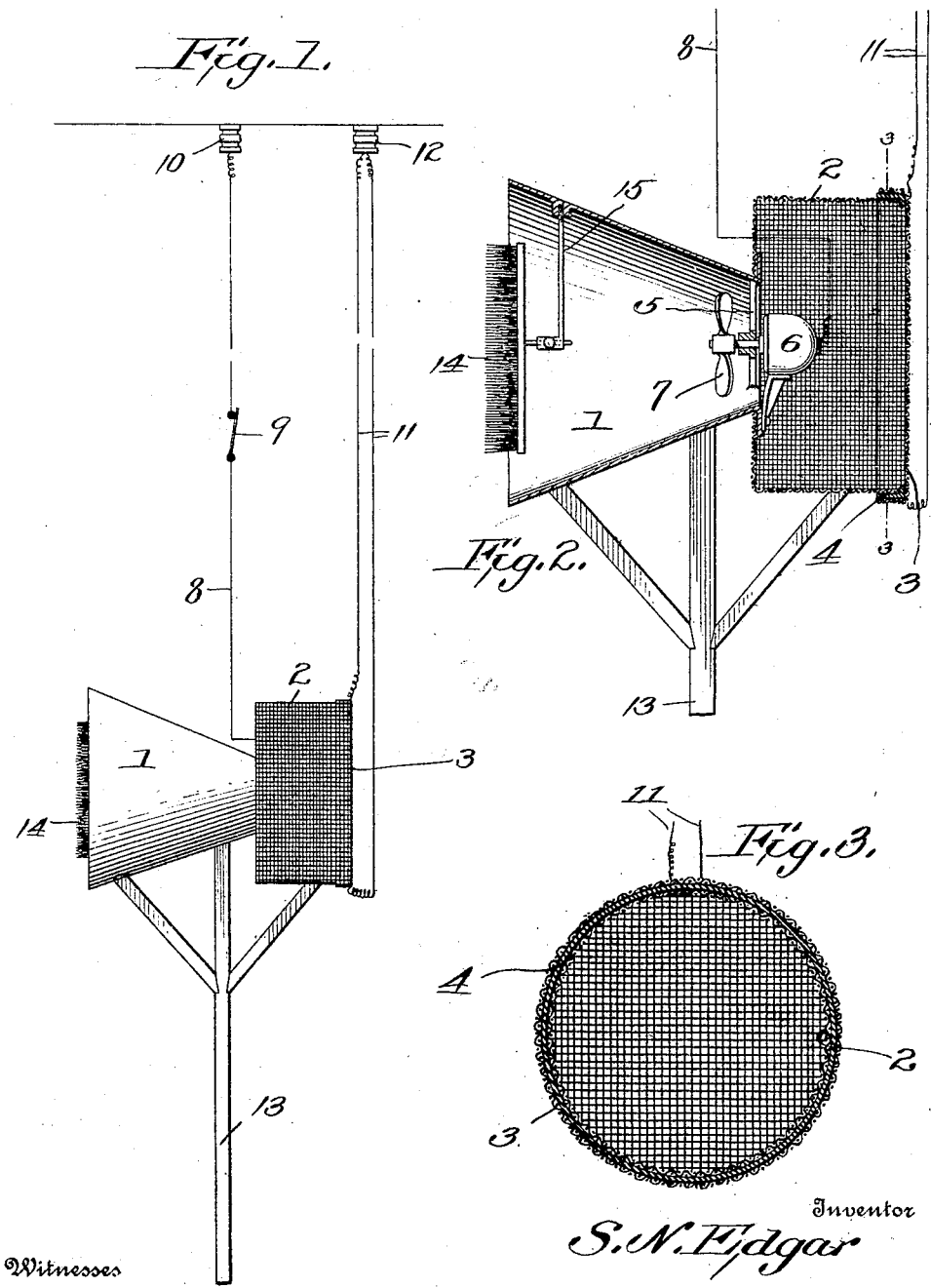
Witnesses
Oliver W. Holmes
E. B. McBath
Inventor
S. N. Edgar
By Chas E Bock
Attorney

UNITED STATES PATENT OFFICE.

SAMUEL N. EDGAR, OF LANDER, WYOMING.

FLY-TRAP.

1,055,620.

Specification of Letters Patent.  Patented Mar. 11, 1913.

Application filed April 23, 1912.  Serial No. 692,689.

*To all whom it may concern:*

Be it known that I, SAMUEL N. EDGAR, a citizen of the United States, residing at Lander, in the county of Fremont and State of Wyoming, have invented a new and useful Improvement in Fly-Traps, of which the following is a specification.

This invention relates to a fly trap.

The object of the invention is to draw flies and other insects into a suitable screen receptacle by means of suction and to incinerate them therein.

The invention consists of the novel features of construction hereinafter described, pointed out in the claims and shown in the accompanying drawings, in which:

Figure 1 is a side elevation of the complete device. Fig. 2 is a vertical section through the trap. Fig. 3 is a section on the line 3—3 of Fig. 2, looking toward the rear.

The device consists of a funnel 1 which opens into a cylindrical screen trap 2. The rear end of the cylinder 2 is disclosed by a circular head 3 also of wire gauze, said head being detachably fitted upon the cylinder 2, the screen having a rim 4 of hard rubber, papier-mâché, or other suitable insulating material. The funnel carries at its rear end a suitable spider 5 in which is journaled the shaft of an electric motor 6 carrying a fan 7. The motor is included in an electric circuit 8 in which is arranged a switch 9, the wires being connected to an ordinary wall socket 10. The wire gauze of which the cylinder head 3 is formed is included in a circuit 11 also connected to a wall plug 12, although it will be understood that the motor and the screen 3 can be connected in any way most convenient at the point of use.

I have shown the device mounted upon a bracket 13 but any form of support can be employed.

To enable the device to be used after dark in collecting flies from walls, ceilings and other places where they may have gathered a detachable brush 14 is adapted to be connected to a suitable bracket 15, carried within the funnel 1, the brush projecting slightly beyond the mouth of the funnel.

It will be understood that after the motor has, through the operation of the fan, collected a large number of flies within the receptacle 2, the switch 9 is opened and the motor cut out. Current is then passed through the screen 3 and as the flies will collect upon said screen they will be incinerated and it will of course be further understood that the motor will be run in the day time, and each evening the motor will be cut out and current turned through the screen 3. The fine gauze wire of which said screen is formed will become incandescent, and all of the flies in the receptacle will be attracted to said screen, instead of trying to escape through the open end.

What I claim is:

1. In a fly trap, a funnel, a receptacle, a gauze wire screen adapted to close the rear end of the receptacle, and insulated therefrom, a suction fan in the funnel, and an electric circuit which includes the said screen.

2. A device of the kind described comprising a funnel, an electric fan therein, a cylindrical screen carried by the rear of the funnel, and a detachable wire screen forming a head for the rear end of the cylindrical screen, said head comprising a rim of a non-conducting material and being detachable from the cylindrical screen, and an electric circuit the screen of the head being included in said circuit.

SAMUEL N. EDGAR.

Witnesses:
C. H. MAXWELL,
L. E. WINSLOW.